United States Patent [19]

Klopfenstein

[11] Patent Number: 4,745,815
[45] Date of Patent: May 24, 1988

[54] NON-JAMMING SCREW ACTUATOR SYSTEM

[75] Inventor: Brent A. Klopfenstein, Rockford, Ill.

[73] Assignee: Sundstrand Corporation, Rockford, Ill.

[21] Appl. No.: 939,407

[22] Filed: Dec. 8, 1986

[51] Int. Cl.[4] .................. F16H 25/20; F16H 57/10
[52] U.S. Cl. .............................. 74/424.8 R; 74/411.5
[58] Field of Search ............. 74/89.15, 424.8 R, 411.5

[56] References Cited

U.S. PATENT DOCUMENTS

| Re. 31,627 | 7/1984 | Evans | 74/424.8 R |
|---|---|---|---|
| 2,569,542 | 10/1951 | Skidmore et al. | |
| 2,660,026 | 11/1953 | Geyer | 74/424.8 R |
| 2,664,255 | 12/1953 | Crandall et al. | |
| 2,701,478 | 2/1955 | Riess | |
| 2,769,430 | 11/1956 | Geyer | |
| 2,857,775 | 10/1958 | Ochtman | |
| 2,875,630 | 3/1959 | Gill et al. | |
| 2,958,232 | 11/1960 | Benninghoff et al. | |
| 3,053,104 | 9/1962 | Scavini | |
| 3,195,366 | 7/1965 | Smith | 74/424.8 R |
| 3,210,852 | 10/1965 | Herndon | 74/89.15 |
| 3,221,118 | 11/1965 | Hoover | |
| 3,269,199 | 8/1966 | Deehan et al. | 74/89.15 |
| 3,327,826 | 6/1967 | Henschke | |
| 3,343,427 | 9/1967 | Silvestri | |
| 3,402,613 | 9/1968 | Neusel et al. | 74/89.15 |
| 3,802,281 | 4/1974 | Clarke | 74/89.15 |
| 3,803,926 | 4/1974 | Winter | |
| 4,149,430 | 4/1979 | F'Geppert | |
| 4,442,928 | 4/1984 | Eastman | |
| 4,603,594 | 8/1986 | Grimm | 74/424.8 R |
| 4,637,272 | 1/1987 | Teske et al. | 74/424.8 R |

FOREIGN PATENT DOCUMENTS 943397  10/1948  France ..................... 74/424.8 R Primary Examiner—Lawrence Staab
Attorney, Agent, or Firm—Wood, Dalton, Phillips, Mason & Rowe

[57] ABSTRACT

A non-jamming ballscrew actuator system which includes an inner screw, an intermediate ballscrew internally threaded on the inner screw, and an outer ballscrew nut rotatably mounted about the ballscrew. An actuator is operatively associated with a load to be actuated and connected to the inner screw for axial movement therewith. A drive rotates the ballscrew nut to axially move the ballscrew. A first brake prevents rotation of the ballscrew, and a second brake prevents rotation of the inner screw. In the event of jamming between the ballscrew and ballscrew nut, the first brake is released to allow the ballscrew to threadingly drive the inner screw and, thereby, move the actuator. In the event of failure of the drive, the second brake is released to allow reaction movement of the actuator means in response to load forces.

11 Claims, 1 Drawing Sheet

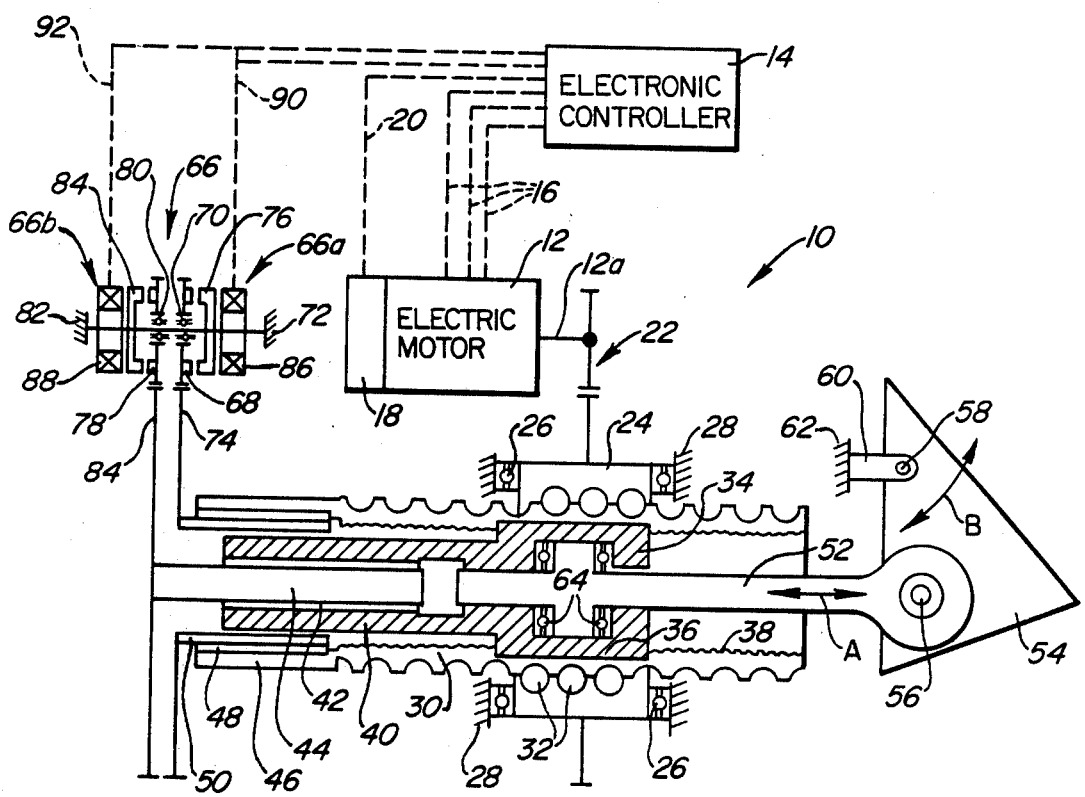

NON-JAMMING SCREW ACTUATOR SYSTEM

CROSS-REFERENCE TO RELATED APPLICATION

This application is related to but in no way dependent upon copending application Ser. No. 932,878, filed Nov. 20, 1986.

BACKGROUND OF THE INVENTION

It has been recognized, especially in the actuation or control of aircraft primary flight control surfaces, that failure modes which result in the surface being jammed can cause a flight safety problem. System failures, such as a loss of voltage or extremely high voltage, could cause a command signal to actuate the control surface to an extreme position which also would result in a critical flight safety situation. Actuators move or control such control surfaces as rudders, horizontal stabilizers, ailerons, and the like.

Traditionally, flight control systems for commercial and military aircraft primarily have employed hydromechanical actuation systems due to the reliable, non-jamming high response characteristics of hydraulic cylinders. Advancements in electronics and the development of rare earth permanent magnet brushless DC motors, with their characteristic high torque to inertia ratio, have led the trend toward digital fly-by-wire flight control systems controlled by computers versus the traditional hydraulic modes. The advantages of such advanced fly-by-wire flight control systems include reduced weight and maintenance due to the elimination of fluid plumbing throughout the aircraft, and active flight control for stability augmentation and ride quality enhancement.

However, the advanced electromechanical actuation systems use geared rotary or linear ballscrew or Acme threaded actuators which often are considered unacceptable for many applications due to failure conditions where the system can jam in a fixed position. This results in a jammed control surface, and there also is concern about ballscrew wear, response speeds and actuator stiffness. Of course, jamming is of critical importance because of the safety problem involving loss of control of the aircraft.

This invention is directed to solving the above problems by combining the advantages of electromechanical actuation system fly-by-wire technology with a reliable, non-jamming, high response feature incorporated in the system. The above-referenced copending application discloses a novel non-jamming ballscrew actuator which includes a closed hydraulic circuit providing the driving link for the actuator, the circuit being selectively openable in the event of jamming of the ballscrew to allow reaction movement of the actuator in response to load forces on the control surface. The present invention is directed to a new and improved non-jamming mechanical ballscrew actuator system which provides for driving the actuator notwithstanding jamming of the ballscrew assembly but which also allows for reaction movement of the actuator means in respone to load forces in the event of failure of the system upstream of the ballscrew assembly.

SUMMARY OF THE INVENTION

An object, therefore, of the invention is to provide a new and improved non-jamming screw actuator system of the character described.

In the exemplary embodiment of the invention, the actuator system generally includes inner screw means, intermediate means including inner nut and outer screw means, and outer nut means. Actuator means are operatively associated with a load to be actuated and connected to the inner screw means for movement therewith. Drive means rotate the outer nut means to axially move the intermediate means. Brake means are provided for preventing rotation of the inner screw means, for preventing rotation of the intermediate means, for releasing the intermediate means in the event of jamming between the intermediate means and the outer nut means to threadingly drive the inner screw means and, thereby, the actuator means, and for releasing the inner screw means in the event of failure of the drive means to allow reaction movement of the actuator means in response to load forces.

More particularly, the intermediate means is disclosed as a ballscrew internally threaded onto the inner screw means. The outer nut means comprise an outer ballscrew nut rotatably mounted about the ballscrew. First brake means prevent rotation of the ballscrew, and second brake means prevent rotation of the inner screw means. The first brake means are releasable in the event of jamming between the ballscrew and ballscrew nut to allow the ballscrew to threadingly drive the inner screw means and, thereby, move the actuator means. The second brake means are releasable in the event of failure of the drive means or other failure upstream of the ballscrew assembly to allow reaction movement of the actuator means in response to load forces.

The actuator means are connected to the inner screw means by journal means allowing relative rotation therebetween so that the inner screw means can be rotated to move axially and the actuator means can move linearly therewith without rotation.

Other objects, features and advantages of the invention will be apparent from the following detailed description taken in connection with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which like reference numerals identify like elements in the figures and in which:

The single FIGURE is a somewhat schematic illustration of the non-jamming ballscrew actuator system of the invention.

DETAILED DESCRIPTION OF THE PREFERRED EMBODIMENT

Referring to the drawing in greater detail, a non-jamming actuator system, generally designated 10, is disclosed and includes a drive means, including an electric motor 12 and an electronic controller 14. Power input and signal or command input is directed to electronic controller 14. Lines 16 between the controller and the motor direct command signals to the motor to operate or drive the mechanical components of the system. A resolver 18 feeds a signal back to controller 14, through line 20, as to the operative condition of motor 12, such as locational information depending on the number of revolutions of the motor. A rotary variable displacement transducer may be provided. This signal also may indicate a jamming of the ballscrew assembly, as described below, as indicated by motor stoppage or may indicate motor failure, whereupon the electronic controller would actuate certain brake means described hereinafter.

A drive shaft 12a of motor 12 is coupled to a gear train, generally designated 22, which rotates a ballscrew nut 24 journaled by bearings 26 to a housing 28 which may comprise a portion of the framework or fuselage of an aircraft. The ballscrew nut is part of a ballscrew assembly which includes a ballscrew 30 and appropriate balls 32 to mechanically and rotatably link the nut and ballscrew in conventional, known fashion. An inner screw 34 is threadingly coupled, as at 36, to interior screw threads 38 of ballscrew 30. A rearwardly extending tubular portion 40 of inner screw 30 is splined, as at 42, to a shaft extension 44 whereby tubular portion 40 and shaft extension 44 are relatively movable linearly but not relatively movable rotatably. Likewise, ballscrew 30 has a rear portion 46 splined, as at 48, to a cylindrical member 50 whereby rear portion 46 and cylindrical member 50 are relatively movable axially but not relatively movable rotatably.

From the foregoing, it can be seen that a screw assembly is incorporated within a ballscrew assembly so as to include inner screw means 34, intermediate means 30 including inner nut and outer screw means, and outer nut means 24.

Actuator means, in the form of an actuator rod 52 is pivotally mounted to a control surface 54 at pivot point 56. The control surface is pivotally mounted, at 58, to a mounting member 60 fixed to a housing 62 which may comprise the frame or fuselage of an aircraft. Control surface 54 may be the rudder, horizontal stabilizer, aileron, or other control surface of the aircraft. Therefore, it can be seen that axial movement of actuator rod in the direction of double-headed arrow "A" will pivotally move control surface 4 in the direction of double-headed arrow "B". Actuator rod 52 is journalled by bearings 64 interiorly of inner screw 34 whereby the inner screw can rotate relative to actuator rod 52 and move the actuator rod linearly without rotation.

Generally, brake means, generally designated 66, are provided for preventing rotation of inner screw 34; for preventing rotation of ballscrew 30; for releasing the ballscrew in the event of jamming between the ballscrew and outer ballscrew nut 24 to threadingly drive the inner screw and, thereby, actuator rod 52; and for releasing inner screw 34 in the event of failure of the drive means to allow reaction movement of the actuator in response to load forces on control surface 54.

More particularly, first brake means, generally designated 66a, include a freely rotatable brake pad 68 having bearing means 70 journaled on the housing, as at 72. Brake pad 68 is coupled by gear train means 74 to cylindrical member 50 which is splined to ballscrew 30 at 48. An electrically operated brake pad 76 is selectively movable into and out of braking engagement with brake pad 68. Upon braking engagement, rotation of ballscrew 30 is prevented.

A second brake means, generally designated 66b, include a freely rotatable brake pad 78 having bearing means 80 journaled on the housing, as at 82. Brake pad 78 is coupled by gear train means 84 to shaft extension 44 splined to inner screw 34 as at 42. An electrically operated brake pad 84 is selectively movable axially into and out of braking engagement with brake pad 78 to prevent rotation of inner screw 34.

Both brake pads 76 and 84 are axially movable but nonrotatably mounted to effect the braking action with rotatable brake pads 68 and 78, respectively. Appropriate electronic means, such as solenoids 86 and 88, may be used to effect movement of brake pads 76 and 84, respectively. Command lines 90 and 92 lead from electronic controller 14 to energize solenoids 86 and 88, respectively, in response to appropriate signals and to selectively, individually release the braking action when jamming or failure occur, as described hereinafter.

During normal operation, both first and second brakes 66a and 66b are energized so that ballscrew 30 and inner screw 34 are rotatably fixed. Therefore, as motor 12 rotates ballscrew nut 24, through gear train 22, the ballscrew, the inner screw and actuator rod 52 move axially to move control surface 54. Of course, bi-directional axial movement is afforded depending upon the electronic signal directed to motor 12 which is a reversible motor drive means.

In the event of jamming between ballscrew 30 and ballscrew nut 24, this condition is sensed by appropriate means, such as transducer 18, whereby a signal is fed to controller 14. The controller then directs a signal to first brake means 66a to release the brake. This allows for relative rotation between ballscrew 30 and inner screw 34. With the ballscrew and ballscrew nut 24 are jammed, these two components now act as a unitary nut rotating about inner screw 34, since second brake 66b still is energized. Under such jammed conditions, movement of control surface 54 still is afforded although at a somewhat slower rate because threads 36,38 are less efficient than the tracks for balls 32 of the ballscrew assembly.

In the event of a failure of the drive means which may take the form of failure of motor 12 or other components of the drive means, second brake 66b is de-energized or released while first brake 66a still is energized. Under these conditions, inner screw 34 can be moved axially within ballscrew 30 by means of threaded engagement 36 to allow reaction movement of the actuator means in response to load forces on control surface 54. Therefore, the control surface cannot be held stuck in any extreme position and can move back to a neutral position under the load forces thereon.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A non-jamming ballscrew actuator system, comprising:
   an inner screw;
   an intermediate ballscrew internally threaded on the inner screw;
   an outer ballscrew nut rotatably mounted about the ballscrew;

actuator means operatively associated with a load to be actuated and connected to the inner screw for axial movement therewith;

drive means for rotating the ballscrew nut to axially move the ballscrew; and brake means for preventing relative rotation between the inner screw and the ballscrew to effect movement of the actuator means in response to movement of the ballscrew, the brake means being selectively releasable in the event of jamming of the ballscrew and ballscrew nut to allow the ballscrew to threadingly drive the inner screw and, thereby, move the actuator means.

2. The non-jamming ballscrew actuator system of claim 1 wherein the actuator means is connected to the inner screw by journal means allowing relative rotation therebetween.

3. The non-jamming ballscrew actuator system of claim 1 wherein said brake means include means for holding the inner screw against rotation.

4. The non-jamming ballscrew actuator system of claim 1 wherein said brake means include means for holding the ballscrew against rotation.

5. The non-jamming ballscrew actuator system of claim 4 wherein said brake means include means for holding the inner screw against rotation.

6. A non-jamming ballscrew actuator system, comprising:

an inner screw;

an intermediate ballscrew internally threaded on the inner screw;

an outer ballscrew nut rotatably mounted about the ballscrew;

actuator means operatively associated with a load to be actuated and connected to the inner screw for axial movement therewith;

drive means for rotating the ballscrew nut to axially move the ballscrew;

first brake means for preventing rotation of the ballscrew;

second brake means for preventing rotation of the inner screw;

the first brake means being releasable in the event of jamming between the ballscrew and ballscrew nut to allow the ballscrew to threadingly drive the inner screw and, thereby, move the actuator means; and the second brake means being releasable in the event of failure of the drive means to allow reaction movement of the actuator means in response to load forces.

7. The non-jamming ballscrew actuator system of claim 6 wherein the actuator means is connected to the inner screw by journal means allowing relative rotation therebetween.

8. A non-jamming ballscrew actuator system, comprising:

inner screw means;

intermediate means including inner nut and outer screw means;

outer nut means;

actuator means operatively associated with a load to be actuated and connected to the inner screw means for movement therewith;

drive means for rotating the outer nut means to axially move the intermediate means; and brake means for preventing rotation of the inner screw means, for preventing rotation of the intermediate means, for releasing the intermediate means in the event of jamming between the intermediate means and the outer nut means to threadingly drive the inner screw means and, thereby, the actuator means, and for releasing the inner screw means in the event of failure of the drive means to allow reaction movement of the actuator means in response to load forces.

9. The non-jamming ballscrew actuator system of claim 8 wherein the actuator means is connected to the inner screw means by journal means allowing relative rotation therebetween.

10. A non-jamming ballscrew actuator system, comprising:

an inner screw;

an intermediate ballscrew internally threaded on the inner screw;

an outer ballscrew nut rotatably mounted about the ballscrew;

actuator means operatively associated with a load to be actuated and connected to the inner screw for axial movement therewith;

drive means for rotating the ballscrew nut to axially move the ballscrew; and brake means for preventing relative rotation between the inner screw and the ballscrew to effect movement of the actuator means in response to movement of the ballscrew, the brake means being selectively releasable in the event of failure of the drive means to allow reaction movement of the actuator means in response to load forces as the inner screw rotates.

11. The non-jamming ballscrew actuator system of claim 10 wherein the actuator means is connected to the inner screw by journal means allowing relative rotation therebetween.

* * * * *